(12) United States Patent
Koyama

(10) Patent No.: US 8,228,619 B2
(45) Date of Patent: Jul. 24, 2012

(54) LENS BARREL AND OPTICAL APPARATUS INCLUDING THE SAME

(75) Inventor: Atsushi Koyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 178 days.

(21) Appl. No.: 12/848,932

(22) Filed: Aug. 2, 2010

(65) Prior Publication Data

US 2011/0032627 A1 Feb. 10, 2011

(30) Foreign Application Priority Data

Aug. 6, 2009 (JP) ................................. 2009-183427

(51) Int. Cl.
*G02B 15/14* (2006.01)
(52) U.S. Cl. ..................................................... 359/701
(58) Field of Classification Search .................. 359/694, 359/696, 699, 701
See application file for complete search history.

(56) References Cited

U.S. PATENT DOCUMENTS 7,649,695 B2 * 1/2010 Koyama et al. ............... 359/701

FOREIGN PATENT DOCUMENTS

| JP | 2001-318292 A | 11/2001 |
| JP | 2005-77425 A | 3/2005 |

* cited by examiner

*Primary Examiner* — Joseph P Martinez
(74) *Attorney, Agent, or Firm* — Canon U.S.A., Inc. IP Division

(57) ABSTRACT

A lens barrel includes lens units movable in an optical axis direction, a driving unit including an annular actuator in which an optical axis serves as a rotation center, a first cam cylinder disposed inwardly of the annular actuator and including a circular cylindrical base portion and a large-diameter portion, a second cam cylinder configured to drive at least one of the lens units by rotating at an outer-peripheral side of the large-diameter portion, and a rotation transmitting portion provided at the large-diameter portion and transmitting rotation of the first cam cylinder to the second cam cylinder, wherein, in a state in which the length of the lens barrel is shortest, a portion of the second cam cylinder and the rotation transmitting portion overlap in the optical axis direction a lens unit holding frame that is closest to an object side.

6 Claims, 2 Drawing Sheets

LENS BARREL AND OPTICAL APPARATUS INCLUDING THE SAME

BACKGROUND OF THE INVENTION

1. Field of the Invention

The present invention relates to a lens barrel and an optical apparatus including the lens barrel.

2. Description of the Related Art

Hitherto, an image taking lens used in an optical apparatus such as a single-lens reflex camera is required to have advanced functions at a high zoom ratio (high magnification ratio) that exceeds 5×. For example, an image taking lens is required to have an autofocus function. From the viewpoints of increasing speed, silencing noise, and increasing precision, an autofocus actuator is required to be an annular oscillating-wave motor that rotates around an optical axis. As other functions, an image taking lens is required to have an image blur correcting mechanism for restricting image blur caused by hand shake.

In addition, for further increasing convenience, there is a demand for reducing the size of the entire lens barrel. In general, in order to obtain a high zoom ratio in a zoom lens, it is effective to increase a moving-out amount of a lens unit that is closest to an object side (hereunder referred to as the "first lens unit"). However, when an attempt is made to provide the aforementioned functions or to reduce the size, the moving-out amount of the first lens unit cannot be made large.

Japanese Patent Laid-Open Nos. 2005-77425 and 2001-318292 each discuss a lens barrel of a zoom lens whose zoom ratio is increased by moving out a moving-out mechanism of a first lens unit in two or more steps.

Japanese Patent Laid-Open No. 2005-77425 discusses a structure of the lens barrel in which the moving-out amount of the first lens unit is made large by a first cam cylinder disposed inwardly of a first stationary cylinder, a second cam cylinder disposed inwardly of the first cam cylinder, and a cam groove provided at the inner periphery of a first lens unit moving cylinder. In this structure, if the first cam cylinder is rotated by a zoom operation, rotation is transmitted to the second cam cylinder by mutual action between a straight groove of the first cam cylinder and a roller provided at the second cam cylinder.

However, in the lens barrel discussed in Japanese Patent Laid-Open No. 2005-77425, if an attempt is made to mount the aforementioned annular actuator as a driving unit of the lens unit, the length of the first lens unit moving cylinder in the direction of an optical axis is restricted. Therefore, a sufficient moving-out amount of the first lens unit moving cylinder cannot be easily provided. In addition, since a cam cylinder 1 and a cam cylinder 2 are disposed inwardly of the stationary cylinder, if an attempt is made to mount the aforementioned image blur correcting mechanism, the image blur correcting mechanism needs to be disposed in a narrow space situated inwardly of the cam cylinder 2. This makes it difficult to mount a mechanism that can provide a sufficient image blur correction effect.

Japanese Patent Laid-Open No. 2001-318292 discusses a structure of the lens barrel in which the moving-out amount of a first unit cylinder is made large by a first cam cylinder disposed outwardly of a stationary cylinder, a thrust ring disposed outwardly of the first cam cylinder, and a third cam cylinder rotatable relative to the thrust ring. In this structure, if the first cam cylinder is rotated by a zoom operation, its rotation is transmitted to the third cam cylinder by mutual action between a roller provided at an end of the first cam cylinder and a straight groove of the third cam cylinder.

However, even in the lens barrel discussed in Japanese Patent Laid-Open No. 2001-318292, if an attempt is made to mount the aforementioned annular actuator as a driving unit of the lens unit, the length of the third cam cylinder in the direction of an optical axis is restricted. Therefore, a sufficient moving-out amount of the first unit cylinder cannot be provided. In addition, if an attempt is made to provide a sufficient moving-out amount of the first unit cylinder by increasing the length of the third cam cylinder, the transmission of rotation between the first cam cylinder and the third cam cylinder is limited. Therefore, the movement amounts of the thrust ring and the third cam cylinder cannot be made large. Consequently, when the cam cylinder 3 is made longer towards an object side, the shortest overall lens length is increased.

SUMMARY OF THE INVENTION

According to the present invention, there is provided a lens barrel comprising a plurality of lens units movable in a direction of an optical axis; a driving unit including an annular actuator in which the optical axis serves as a rotation center; a first cam cylinder disposed inwardly of the annular actuator, the first cam cylinder including a circular cylindrical base portion and a large-diameter portion, the base portion rotating to drive at least one of the plurality of lens units, the large-diameter portion having an outside diameter that is larger than that of the base portion, the large-diameter portion being positioned in an area differing from an area where the annular actuator is disposed in the direction of the optical axis; a second cam cylinder configured to drive the at least one of the plurality of lens units as a result of rotating at an outer-peripheral side of the large-diameter portion; and a rotation transmitting portion provided at the large-diameter portion, the rotation transmitting portion being configured to transmit rotation of the first cam cylinder to the second cam cylinder. In the lens barrel, in a state in which a length of the lens barrel is shortest, a portion of the second cam cylinder and the rotation transmitting portion overlap a lens unit holding frame in the direction of the optical axis or an end portion of the large-diameter portion is positioned between a lens unit holding frame and the second cam cylinder so as to overlap a portion of the lens unit holding frame in the direction of the optical axis, the lens unit holding frame being disposed closest to an object side.

Further features of the present invention will become apparent from the following description of exemplary embodiments with reference to the attached drawings.

DESCRIPTION OF THE EMBODIMENTS

Figure 1:
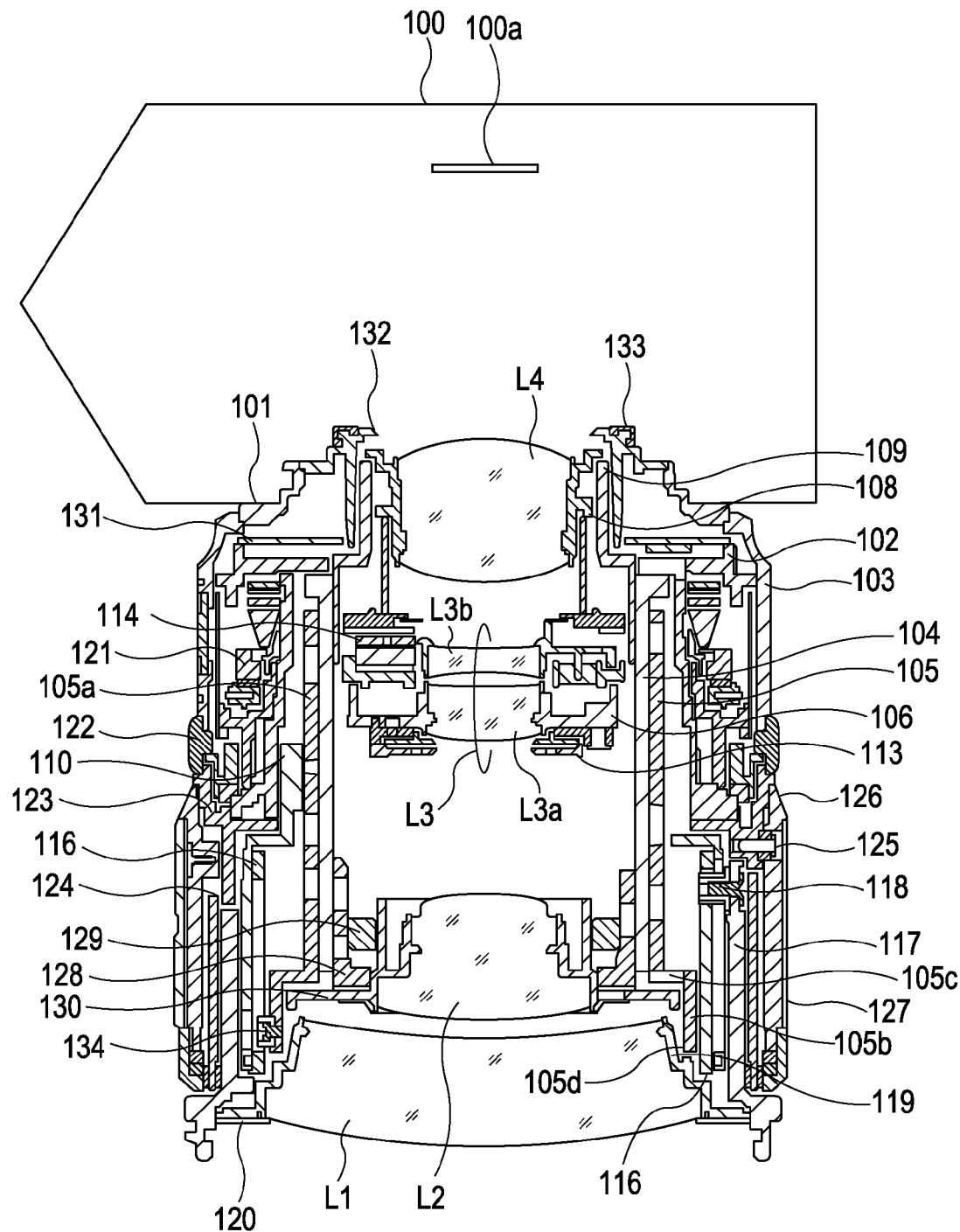
FIG. 1 is a sectional view of a case in which the entire length of an interchangeable lens of a single-lens reflex camera is shortest.

Preferred embodiments of the present invention will hereunder be described in detail with reference to the attached drawings.

A lens barrel according to the present invention includes a plurality of lens units (L1 to L4) that are movable in a direction of an optical axis, and a focus unit (driving unit) 121 including an annular actuator in which the optical axis serves as a rotation center. In addition, the lens barrel includes a first cam cylinder 105 disposed inwardly of the annular actuator. The first cam cylinder 105 drives at least some of the plurality of lens units as a result of rotating by rotation force from a zoom operating ring 126. The first cam cylinder 105 has a circular cylindrical base portion 105a, disposed at an area overlapping the annular actuator in the direction of the optical axis, and a large-diameter portion 105b, disposed at an area that does not overlap the annular actuator (different area) and having an outside diameter that is larger than that of the base portion 105a. At the outer peripheral side of the large-diameter portion 105b, the lens barrel includes a second cam cylinder 116 and a rotation transmitting portion (roller) 134. The second cam cylinder 116 rotates to drive some of the plurality of lens units. The rotation transmitting portion 134 is provided at the large-diameter portion 105b and transmits the rotation of the first cam cylinder 105 to the second cam cylinder 116.

In a state in which the length of the lens barrel becomes shortest, an end portion 105d of the large-diameter portion 105b of the first cam cylinder 105 is formed so as to be positioned between a first unit holding frame 119 (lens unit holding frame) and a second straight cylinder 117 and so as to overlap a portion of the first unit holding frame 119 in the direction of the optical axis.

In a state in which the length of the lens barrel is shortest, a portion of the second cam cylinder 116 and the rotation transmitting portion 134 are formed so as to overlap in the direction of the optical axis the lens unit holding frame 119 that is closest to an object side. In addition, an image blur correcting mechanism is disposed inwardly of the first cam cylinder 105.

An optical apparatus according to the present invention includes the lens barrel having the above-described features.

Figure 2:
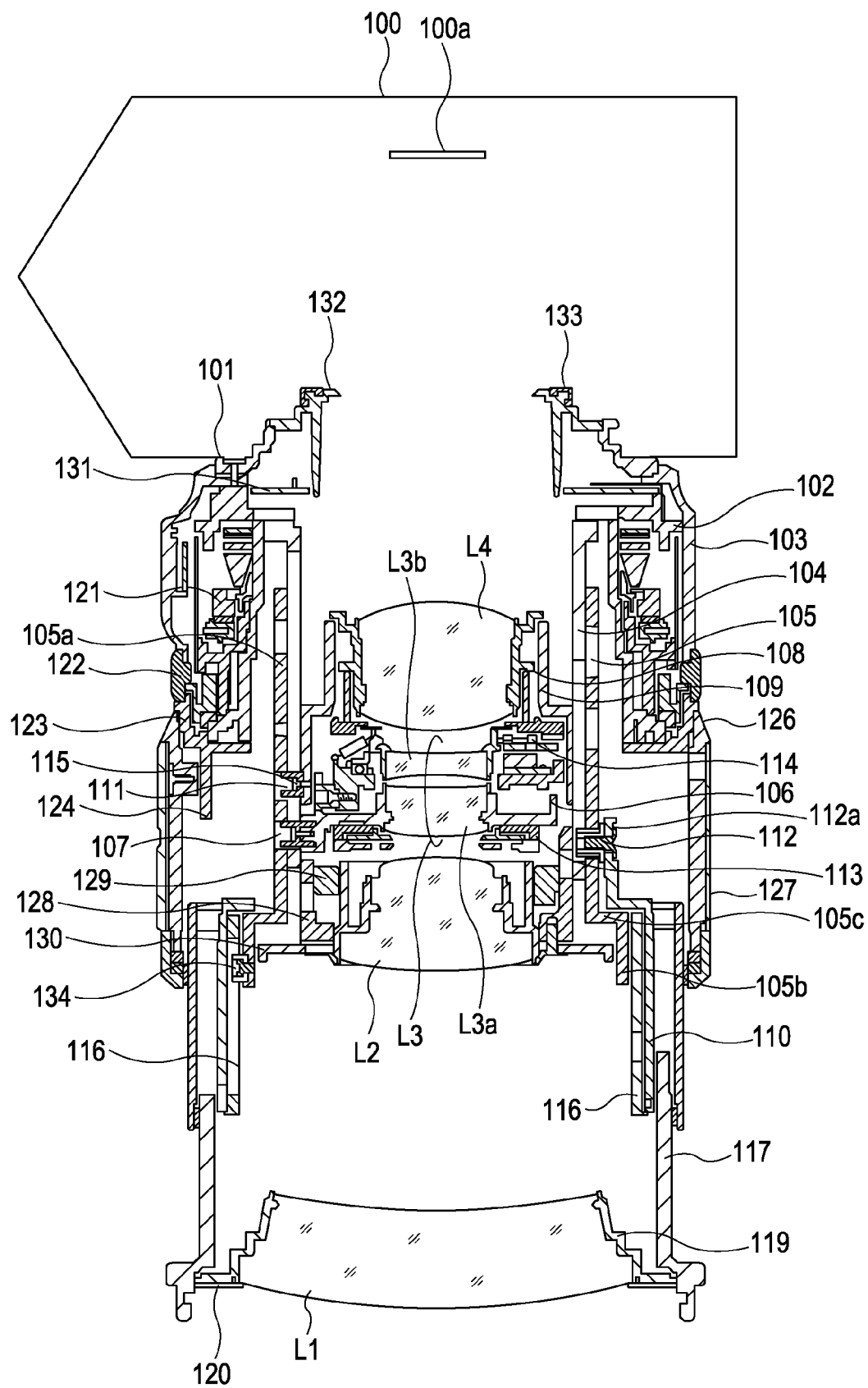
FIG. 2 is a sectional view of a case in which the entire length of the interchangeable lens of the single-lens reflex camera is longest.

FIGS. 1 and 2 are sectional views showing an internal structure of an interchangeable zoom lens for a single-lens reflex camera (optical apparatus) according to an embodiment of the present invention, and schematically showing a camera body 100 to which the internal structure of the interchangeable zoom lens is mounted.

FIG. 1 shows a case in which the entire length of the lens barrel of the interchangeable zoom lens of the single-lens reflex camera is shortest, and in which the lens barrel is at a zooming position at a wide-angle end.

FIG. 2 shows a case in which the entire length of the lens barrel of the interchangeable zoom lens of the single-lens reflex camera is longest, and in which the lens barrel is at a zooming position at a telephoto end.

First Embodiment

A lens barrel 1 according to the embodiment will hereunder be described with reference to FIGS. 1 and 2.

The lens barrel 1 according to the embodiment is removably mounted to the camera body 100. The camera body 100 includes an image pickup element 100a. The camera body 100 also includes other members that are not shown.

An interchangeable lens (image taking lens) of the lens barrel 1 according to the embodiment is a zoom lens including four lens units, that is, a first lens unit L1 to a fourth lens unit L4 in that order from the object side to an image side.

All of the first lens unit L1 to the fourth lens unit L4 move in the direction of the optical axis when a zoom operation (zooming) is performed. The second lens unit L2 moves in the direction of the optical axis during a focus operation.

The third lens unit L3 includes two partial lens units, that is, a 3ath lens unit L3a and a 3bth lens unit L3b. Of these, the 3bth lens unit L3b positioned at the side of the image pickup element 100a is an image stabilizing lens unit that, in addition to moving in the direction of the optical axis, moves in a direction orthogonal to the optical axis for correcting image blur caused by, for example, hand shake.

A mount 101 has a bayonet portion for mounting to the camera body 100, and is secured to a stationary cylinder 102 with a screw. An exterior ring 103 is secured by interposing it between the mount 101 and the stationary cylinder 102. A guide cylinder 104 has a securing portion with respect to the camera body 100 when the stationary cylinder 102 is secured with a screw.

A first cam cylinder 105 that can advance and retreat while rotating around an optical axis by a roller (not shown) during zooming is fitted to the outer periphery of the guide cylinder 104. By this, if the first cam cylinder 105 rotates during zooming, a point of intersection of a guide groove of the guide cylinder 104 extending in the direction of the optical axis and a cam groove of the first cam cylinder 105 moves. Rollers 107, 111, and 112 engage the intersection point.

In accordance with the movement of the intersection point, a third unit holding frame 106 that holds the third lens unit L3 can move in the direction of the optical axis through the roller 107 that is secured to the third unit holding frame 106 with a screw.

Similarly, in accordance with the movement of the intersection point, a fourth unit moving cylinder 109 to which the fourth unit holding frame 108 that holds the fourth lens unit L4 is secured can move in the direction of the optical axis through the roller 111 that is secured to the fourth unit moving cylinder 109 with a screw. Similarly, a first straight cylinder 110 can move in the direction of the optical axis through the roller 112 that is secured to the first straight cylinder 110 with a screw. By moving the first straight cylinder 110, a first unit holding frame 119 is moved as described below.

An electromagnetic stop unit 113 including a stop driving unit and a stop blade is secured to the third unit holding frame 106. In addition, a blur correcting unit 114 is held at a rear end of the third unit holding frame 106 through a roller 115. The blur correcting unit 114 is held so that the 3bth lens unit L3b is drivable in the direction orthogonal to the optical axis of the shooting lens, and drives the 3bth lens unit L3b by a driving unit including a magnet and a coil in the direction orthogonal to the direction of the optical axis.

At the inner periphery of the first straight cylinder 110, a second cam cylinder 116 is fitted by a related bayonet structure. The second cam cylinder 116 is such that its position with respect to the first straight cylinder 110 in the direction of the optical axis is restricted, and such that rotation of the first cam cylinder 105 is transmitted through the rotation transmitting portion (roller 134), so that the second cam cylinder 116 is rotatably fitted. The rotation transmitting portion is a main feature of the present invention, and its structure will be described below.

The first straight cylinder 110 has a guide groove (straight groove) extending in the direction of the optical axis. The second cam cylinder 116 has a cam groove. By this, when the second cam cylinder 116 rotates, a point of intersection of the straight groove of the first straight cylinder 110 and the cam groove of the second cam cylinder 116 moves. In accordance with the movement of the intersection point, the second straight cylinder 117 can move in the direction of the optical axis through a roller 118 secured to the second straight cylinder 117 with a screw.

The first unit holding frame 119 that holds the first lens unit L1 is secured to the vicinity of an end of the second straight cylinder 117. By this, the first lens unit L1 moves in the direction of the optical axis. Contact portions of the second straight cylinder 117 and the first unit holding frame 119 have the form of slopes extending in a circumferential direction.

Therefore, by rotating the first unit holding frame 119 and mounting it to the second straight cylinder 117, it is possible to arbitrarily select the position where the first unit holding frame 119 is mounted to the second straight cylinder 117 in the direction of the optical axis. By this, it is possible to properly set the position of the first lens unit L1 in the direction of the optical axis, and to correct displacements of focus positions at a wide-angle end and at a telephoto end caused by manufacturing errors.

A bayonet portion is provided at the outer periphery of an end of the second straight cylinder 117, and a threaded portion is provided at the inner periphery of the second straight cylinder 117. Accessories, such as a hood and a filter, are mountable to the bayonet portion and the threaded portion.

A decorative ring 120 has, for example, the name of a lens printed to its front surface.

A focus unit 121 (driving unit) is disposed so that a mounting portion 112a of the roller 112 at the first straight cylinder 110 moves into a location between the outer periphery of the first cam cylinder 105 and the inner periphery of the focus unit 121, and is secured to the guide cylinder 104.

The focus unit 121 primarily includes a differential mechanism and an annular vibratory motor (annular actuator) rotating around the optical axis as center. The focus unit 121 performs an output operation in accordance with a rotor rotation amount of the vibratory motor and a rotation amount of a manual ring 122. What the annular vibratory motor drives is not limited to a focusing lens unit. The vibratory motor may move any member among, for example, a zooming lens unit, an image stabilizing lens, or a stop mechanism.

A connecting ring 123 is secured to the object side of the focus unit 121. An encoder flexible substrate 124 having a gray code pattern formed thereon is adhered to the outer periphery of a protrusion extending in the form of an arc. Further, a protrusion is provided in a phase in which the encoder flexible substrate 124 is not provided. A roller 125 that engages the zoom operating ring 126 is secured to this protrusion with a screw. By engaging the roller 125 with a groove provided in a peripheral direction of the zoom operating ring 126, only rotation around the optical axis is possible while movement in the direction of the optical axis is prevented.

The zoom operating ring 126 has a vertical groove with which a zoom key (not shown), which is secured to the first cam cylinder 105 with a screw, engages. This makes it possible to transmit rotation of the zoom operating ring 126 to the first cam cylinder 105 through the zoom key.

A zoom rubber 127 is wound around the outer periphery of the zoom operating ring 120. A cam groove is formed in a circular cylindrical portion of a focus cam cylinder 128 that holds a second unit holding frame 130. A roller (not shown), which is secured to the outer periphery of a roller connecting ring 129 and which is inserted in a press-fit state into a hole of the first cam cylinder 105, engages the cam groove. A key extending from the focus cam cylinder 128 engages an output portion of the focus unit 121 so as to rotate together with the output portion of the focus unit 121.

The second unit holding frame 130 holding the second lens unit L2 is secured to the focus cam cylinder 128. By this, when the first cam cylinder 105 rotates, the second unit holding frame 130 advances and retreats in the direction of the optical axis through the focus cam cylinder 128. The advancing/retreating amount is determined by the total of the advancing/retreating amount of the first cam cylinder 105 itself and the amount of change in the direction of the optical axis of a roller engaging point provided at the first cam cylinder 105 that engages the cam groove of the focus cam cylinder 128.

By an output from the focus unit 121, the focus cam ring 128 engages the focus unit 121 so as to rotate together therewith through the key. Therefore, while rotating, the focus cam groove 128 advances and retreats in accordance with the amount of change in the direction of the optical axis of the roller engaging point provided at the first cam cylinder 105 that engages the cam groove of the focus cam cylinder 128.

In the interchangeable lens according to the embodiment, a displacement in a focus position caused by a change in the focal length during inner focusing is mechanically compensated for in this way, so that the second lens unit L2 advances and retreats in the direction of the optical axis.

A main substrate 131 is electrically connected to, for example, the electromagnetic stop unit 113 and the blur correcting unit 114 through a flexible substrate (not shown), to perform various control operations. Through a contact block (not shown), secured to the mount 101 with a screw and connected to the main substrate 131 through the flexible substrate (not shown), communication with and power supply to the camera body 100 are performed.

A back cover 132 cuts off harmful light by elastic coupling with the mount 101. A protective rubber ring 133 is elastically coupled to the back cover 132.

In the lens barrel having the above-described structure, when the zoom operating ring 126 is rotated, the first cam cylinder 105 is rotated through the zoom key. Then, in accordance with the above-described mechanism, the first lens unit L1 to the fourth lens unit L4 advance and retreat in the direction of the optical axis for performing zooming.

By driving the vibratory motor in the focus unit 121 during auto-focusing, or, by rotating the manual ring 122 during manual focusing, the focus cam cylinder 128 is rotated through the differential mechanism in the focus unit 121. In accordance with the above-described mechanism, it is possible to cause the second lens unit L2 held by the second unit holding frame 130 secured to the focus cam cylinder 128 to advance and retreat, and to perform focusing.

In the lens barrel according to the embodiment, when the first cam cylinder 105 rotates by rotation of the zoom operating ring 126, the first straight cylinder 110 moves in a straight line through the roller 112. The rotation of the first cam cylinder 105 causes the second cam cylinder 116 to rotate through the roller 134. Further, the movement of the first straight cylinder 110 in a straight line causes the second cam cylinder 116 and the second straight cylinder 117, subjected to bayonet coupling, to move.

At this time, the rotation of the second cam cylinder 116 causes the second straight cylinder 117 to move further in a straight line through the roller 118. By moving the second straight cylinder 117 in a straight line, the first unit holding frame 119 holding the first lens unit L1 and integrated to the second straight cylinder 117 moves.

Next, a structure of the rotation transmitting portion (roller) 134 for transmitting the rotation from the first cam cylinder 105 to the second cam cylinder 116 and moving the first unit holding frame 119 is described. This structure is a feature of the embodiment.

The first cam cylinder 105 has the circular cylindrical base portion 105a, the large-diameter portion 105b whose outside diameter is larger than that of the base portion 105a, and a flange 105c connecting the base portion 105a and the large-diameter portion 105b. A portion of the base portion 105a overlaps a portion of the focus unit 121 in the direction of the optical axis. Here, the phrase "overlaps . . . in the direction of the optical axis" means that, for example, when the direction of the optical axis corresponds to an X coordinate axis, they have the same X coordinate. In other words, they are disposed side by side in a direction orthogonal to the direction of the optical axis.

In the direction of the optical axis, the large-diameter portion 105b is positioned at an area differing from the portion (area) of the focus unit 121. The large-diameter portion 105b is formed in such a manner that, when the entire length of the lens barrel is shortest, the end portion 105d is positioned in a space, formed by the first unit holding frame 119 and the second straight cylinder 117, so as to overlap a portion of the first unit holding frame 119 in the direction of the optical axis.

Here, the state in which the entire length of the lens barrel is shortest corresponds to a state in which the distance from a lens surface closest to the object side to an image pickup plane is shortest by zooming.

The roller 134 serving as the rotation transmitting portion is secured to the outer periphery of the end portion 105d overlapping the first unit holding frame 119 at the large-diameter portion 105b of the first cam cylinder 105 in the direction of the optical axis. The roller 134 engages a vertical groove of the second cam cylinder 116 disposed at the outer periphery of the large-diameter portion 105b.

In the embodiment, when the entire length of the lens barrel is shortest, a portion of the second cam cylinder 116 and a portion of the first straight cylinder 110 are also disposed so as to overlap a portion of the first unit holding frame 119 in the direction of the optical axis.

According to the above-described structure, compared to a related lens barrel, even when an annular vibratory motor (annular actuator) is mounted, it is possible to ensure the transmission of rotation between the first cam cylinder 105 and the second cam cylinder 116 while providing a sufficient moving-out amount of the first straight cylinder 110.

Since the first straight cylinder 110 and the second cam cylinder 116 can have sufficient lengths in the direction of the optical axis, it is possible to provide a sufficient moving-out amount of the second straight cylinder 117. As a result, the moving-out amount of the first lens unit L1 can be large, so that an image taking lens (zoom lens) having a high zoom ratio can be easily provided.

The focus unit 121 is positioned at an area outside an area where the first cam cylinder 105 and the second cam cylinder 116 overlap in the direction of the optical axis. That is, the focus unit 121 is formed so as to overlap the first cam cylinder 105 at a position in the direction of the optical axis that is different from the area where the first cam cylinder 105 and the second cam cylinder 116 overlap. Therefore, while providing a high zoom ratio, it is possible to easily provide a space that is large enough for movement in a direction orthogonal to the optical axis for correcting image blur by the 3bth lens unit L3b.

Accordingly, according to the embodiment, the second cam cylinder and the rotation transmitting portion, provided at the large-diameter portion of the first cam cylinder, are disposed so as to overlap the first lens unit in the direction of the optical axis when the entire length of the lens barrel is shortest. This makes it possible to provide a sufficiently large movement amount of the first lens unit by efficiently using space.

That is, it is possible to provide a lens barrel that has an annular actuator mounted thereto and that is easily reduced in size while maintaining a high zoom ratio.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-183427 filed Aug. 6, 2009, which is hereby incorporated by reference herein in its entirety.

What is claimed is:

1. A lens barrel comprising:
a plurality of lens units movable in a direction of an optical axis;
a driving unit including an annular actuator in which the optical axis serves as a rotation center;
a first cam cylinder disposed inwardly of the annular actuator, the first cam cylinder including a circular cylindrical base portion and a large-diameter portion, the base portion rotating to drive at least one of the plurality of lens units, the large-diameter portion having an outside diameter that is larger than that of the base portion, the large-diameter portion being positioned in an area differing from an area where the annular actuator is disposed in the direction of the optical axis;
a second cam cylinder configured to drive the at least one of the plurality of lens units as a result of rotating at an outer-peripheral side of the large-diameter portion; and
a rotation transmitting portion provided at the large-diameter portion, the rotation transmitting portion being configured to transmit rotation of the first cam cylinder to the second cam cylinder,
wherein, in a state in which a length of the lens barrel is shortest, a portion of the second cam cylinder and the rotation transmitting portion overlap a lens unit holding frame in the direction of the optical axis or an end portion of the large-diameter portion is positioned between a lens unit holding frame and the second cam cylinder so as to overlap a portion of the lens unit holding frame in the direction of the optical axis, the lens unit holding frame being disposed closest to an object side.

2. The lens barrel according to claim 1, wherein the first cam cylinder is rotated by rotating an operating ring.

3. The lens barrel according to claim 1, wherein an image blur correcting mechanism is disposed inwardly of the first cam cylinder.

4. An optical apparatus comprising:
an image pickup element; and
a lens barrel configured to guide light to the image pickup element,
wherein the lens barrel comprises:
a plurality of lens units movable in a direction of an optical axis;
a driving unit including an annular actuator in which the optical axis serves as a rotation center;
a first cam cylinder disposed inwardly of the annular actuator, the first cam cylinder including a circular cylindrical base portion and a large-diameter portion, the base portion rotating to drive at least one of the plurality of lens units, the large-diameter portion having an outside diameter that is larger than that of the base portion, the large-diameter portion being positioned in an area differing from an area where the annular actuator is disposed in the direction of the optical axis;
a second cam cylinder configured to drive the at least one of the plurality of lens units as a result of rotating at an outer-peripheral side of the large-diameter portion; and
a rotation transmitting portion provided at the large-diameter portion, the rotation transmitting portion being configured to transmit rotation of the first cam cylinder to the second cam cylinder, wherein, in a state in which a length of the lens barrel is shortest, a portion of the second cam cylinder and the rotation transmitting portion overlap a lens unit holding frame in the direction of the optical axis or an end portion of the large-diameter portion is positioned between a lens unit holding frame and the second cam cylinder so as to overlap a portion of the lens unit holding frame in the direction of the optical axis, the lens unit holding frame being disposed closest to an object side.

5. The optical apparatus according to claim 4, wherein the first cam cylinder is rotated by rotating an operating ring.

6. The optical apparatus according to claim 4, wherein an image blur correcting mechanism is disposed inwardly of the first cam cylinder.

\* \* \* \* \*